Dec. 23, 1941  A. A. MASSINI  2,267,409

CAM

Filed Oct. 2, 1941

INVENTOR
Alvin A. Massini
BY
Martin J. Manion
ATTORNEY

Patented Dec. 23, 1941

2,267,409

UNITED STATES PATENT OFFICE 2,267,409

CAM

Alvin A. Massini, Wheeling, W. Va.

Application October 2, 1941, Serial No. 413,274

6 Claims. (Cl. 74—567)

This invention relates to cams or similar mechanical contrivances designed for converting circular motion into reciprocating motion.

One of the objects of the invention is to provide a simple plate cam mechanism for intermittently reciprocating an arm, rod, lever, plunger, or similar element, in such a manner that the driven reciprocating element at the limit of its working stroke is under spring tension exerted by the cam so as to afford a cushioned final thrust and to allow for variance in the dimension of the work being acted upon by the mechanism actuated by said driven reciprocating element.

Another object of the invention is to provide a plate cam designed to function after the fashion of a face or positive box cam whereby objectionable shocks are avoided to the mechanism actuating the cam.

These and other objects of my invention which will be set forth hereinafter or will be apparent to one skilled in the art upon reading these specifications, I accomplish by construction and arrangement of parts of which I shall now describe a preferred embodiment. Reference is now made to the drawing which forms a part hereof, and in which—

Figure 1:
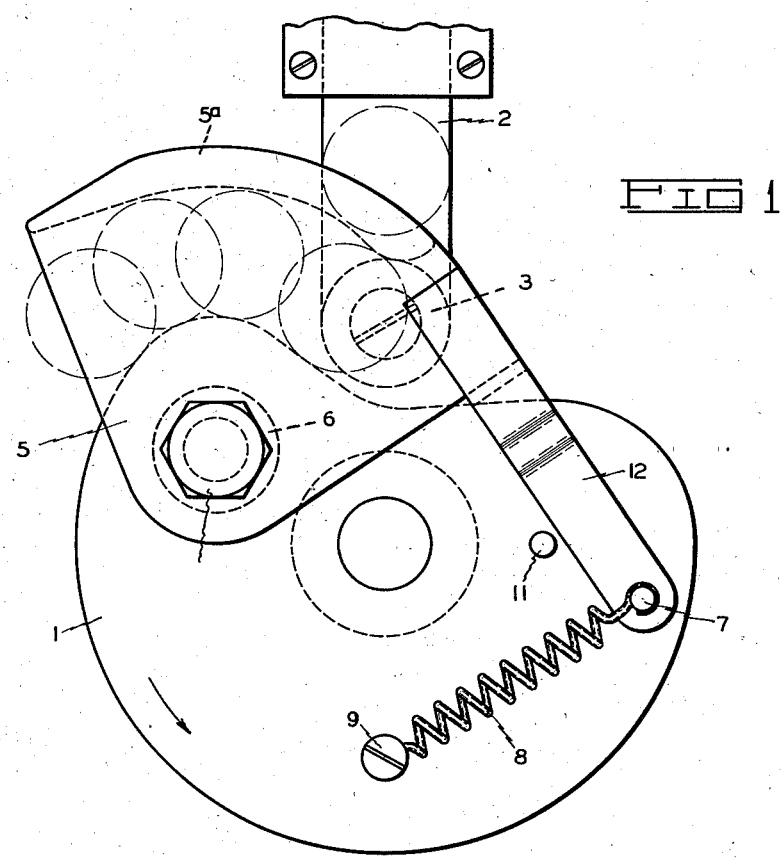
Figure 1 is a front elevational view of my cam mechanism; and—
Figure 2:
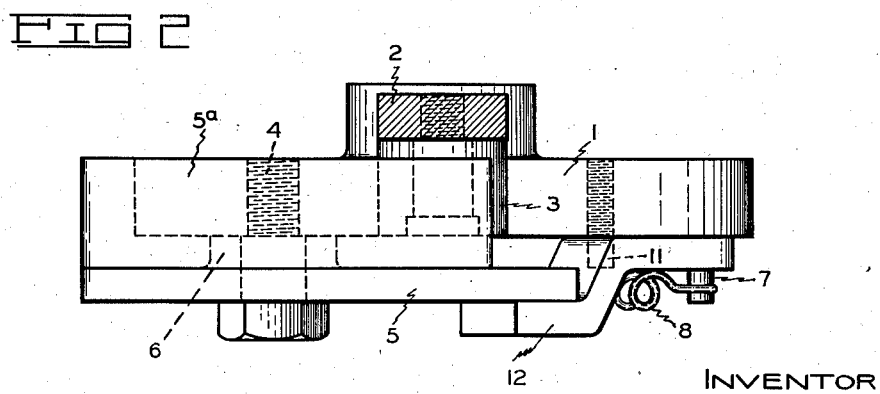
Figure 2 is a top plan view of the same.

Referring to said drawing, the reference numeral 1 designates a plate cam of substantially kidney-shape, although the periphery may have any other desired contour. Associated with the cam 1 is the plunger 2 to be vertically reciprocated intermittently, said plunger having a roller follower 3 at its lower end.

Fastened eccentrically to the side of the cam, as by means of the machine screw 4, is a segmentally-shaped angle plate 5, said plate being free to oscillate within hereinafter described limits about the screw 4 as an axis and being maintained spaced away a distance from the side of the cam by an intermediate spacer 6. As shown in the drawing, the horizontally disposed leg 5ª of the segmental plate overlies the periphery of the cam and is spaced away from the latter to afford a race therebetween for the roller follower 3. As indicated by broken lines in Figure 1 of the drawing, the thickness or depth of the leg 5ª is not uniform, and, instead, progressively increases in thickness from its outer to its inner end, the inner terminal end being rounded.

One end of an arm 12 is permanently attached to the plate 5. The opposite end of said arm has a stud 7 to which is attached one end of a retractile coil spring 8, the opposite end of the spring being connected to a stud 9 protruding from the side of the cam. A pin 11 protrudes from the side of the cam and is adapted to engage the arm 12 to serve as a limit stop to restrict movement of the arm and plate 5 with respect to the cam caused by tension exerted by the spring 8.

In use and as shown in the drawing, for illustrative purposes only, the plunger 2 moves downwardly on its working stroke and the cam 1 is designed to be rotated counterclockwise, as indicated by the arrow in Fig. 1. The peripheral cam face is substantially of kidney-shape, a portion being concentric to maintain the plunger elevated and the remaining portion being irregular to permit downward movement of the plunger on its working stroke. The plunger 2, for purposes of explanation, may be connected to a die or head (not shown) the under face of which carries, as by means of suction, a moistened, gummed label or seal to be deposited on and affixed to a board, box, bottle, or the like supported by a table or bottom die (not shown) beneath and aligned with the reciprocating die.

As the cam rotates, the roller follower 3 rides the concentric periphery to maintain the plunger 2 and its associated die elevated against the force of gravity. As the plate 5 approaches the roller follower 3, the latter enters a roller race (as shown in dotted lines in Fig. 1) between the leg 5ª and the peripheral face of the cam 1 but still in contact with the cam face. Continued rotation of the cam brings the roller follower 3 into the vicinity of the extreme low portion of the cam face and here the follower, as it approaches the extreme low point of the cam, moves out of contact with the face of the cam and, instead, contacts the inner surface of the leg 5ª of the plate 5. At this point, the moistened, gummed label or seal is in contact with the board to which it is to be affixed because the die carrying the label or seal has gravitated sufficiently to be supported by the board with the label or seal disposed intermediate the bottom face of the die and the board.

During continued rotation of the cam, the follower 3 rides the inner surface of the leg 5ª which is increasing in thickness toward its inner end, thereby causing a continued depressing effect on the plunger 2 and its associated die. The additional depressing effect acts to slightly move the plate 5 counterclockwise about its pivot 4, but such movement is resisted by the tension of the retractile coil spring 8 connecting the plate arm 12 and stud 9. Thus, an additional final downward cushioned thrust is given the plunger 2 and its associated die so as to compress the gummed label onto the board to firmly affix the same to the latter. Continued rotation of the cam discharges the follower from the confined race and the follower again contacts and rides the peripheral cam face for raising the plunger and associated die for removal of the board last acted upon and for insertion of a new board beneath the die.

The device, among numerous other uses, is particularly adapted for use in apparatus for affixing crown caps to bottles or for affixing labels to the sides of bottles positioned flatwise beneath a die. The spring 8 permits such bottles to slightly vary in height or thickness because any slight difference in dimension of the work will be compensated for by the spring 8. In other words, a bottle to be capped which is slightly higher than standard will be compensated for by automatic increased elongation of the spring during the capping operation, and a bottle shorter than standard will be compensated for by increased retraction of said spring.

As will be appreciated, the cam is smooth in operation and eliminates objectionable shocks to the mechanism in cases where heretofore the follower and plunger was at all times maintained in contact with the cam by a spring or springs.

What is claimed is—

1. A device for converting circular motion into reciprocating motion comprising a rotatable cam, an element associated with said cam designed to be reciprocated by the latter, said element having a cam follower, and a spring tensioned follower-engaging element associated with the cam at a spaced distance from a portion of the cam face to provide a race for the follower therebetween.

2. A device for converting circular motion into reciprocating motion comprising a rotatable cam, an element associated with said cam adapted to be reciprocated by the latter, said element having a cam follower, and a spring tensioned follower-engaging element associated with the cam at a spaced distance from a portion of the cam face to provide a race for the follower therebetween, said follower-engaging element having an inclined follower-contacting face.

3. A device for converting circular motion into reciprocating motion comprising a rotatable cam whose cam face contour is partially concentric and partially irregular, an element associated with said cam designed to be reciprocated by the latter, said element having a cam follower, and a spring-tensioned follower-engaging element borne by the cam and overlying a portion of the irregular cam face at a spaced distance therefrom to provide a restricted race for the follower therebetween.

4. A device for converting circular motion into reciprocating motion comprising a rotatable cam having a low point in its cam face, an element associated with said cam designed to be reciprocated by the latter, said element having a cam follower, and a spring tensioned follower-engaging element associated with the cam and overlying a portion of the cam face in the vicinity of the low point of the cam.

5. A device as called for in claim 4 wherein the follower-engaging element has an inclined follower-contacting face.

6. A device as called for in claim 4 wherein the follower-engaging element has an inclined follower-contacting face, the inclination being at its maximum at a locale aligned with the low point of the cam.

ALVIN A. MASSINI.